United States Patent
Jung et al.

(10) Patent No.: US 6,520,708 B1
(45) Date of Patent: Feb. 18, 2003

(54) DEVICE FOR CONNECTING TWO PARTS

(75) Inventors: Oliver Jung, Wuppertal (DE); Hartmut Nitzsche, Buehl (DE); Heinz Seibert, Achern (DE); Gerald Kuenzel, Buehl (DE); Hans-Peter Seebacher, Baden-Baden (DE); Bernd Wieland, Gaggenau (DE); Peter Litterst, Achern (DE); Hansjuergen Linde, Coburg (DE); Uwe Neumann, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/701,134
(22) PCT Filed: May 21, 1999
(86) PCT No.: PCT/DE99/01527
§ 371 (c)(1),
(2), (4) Date: Feb. 27, 2001
(87) PCT Pub. No.: WO99/61806
PCT Pub. Date: Dec. 2, 1999

(30) Foreign Application Priority Data

May 23, 1998 (DE) .......................... 198 23 177

(51) Int. Cl.$^7$ .............................. B25G 3/28; F16B 17/00
(52) U.S. Cl. .................... 403/282; 403/364; 403/409.1; 428/33
(58) Field of Search ................. 403/282, 364, 403/381, 386, 409.1; 428/33

(56) References Cited

U.S. PATENT DOCUMENTS

| 3,077,426 | A | * | 2/1963 | Johnston .................... 181/286 |
| 3,991,535 | A | * | 11/1976 | Keller et al. ............. 403/364 X |
| 4,466,754 | A | * | 8/1984 | Poitier .................... 403/286 X |
| 4,521,464 | A | * | 6/1985 | Chapman ...................... 428/33 |
| 4,641,402 | A | * | 2/1987 | Vansant et al. ......... 403/364 X |
| 4,742,661 | A | * | 5/1988 | Burtelson ............... 403/381 X |
| 5,887,672 | A | * | 3/1999 | Kimura .................. 403/386 X |
| 6,112,474 | A | * | 9/2000 | Paine .................... 403/364 X |

FOREIGN PATENT DOCUMENTS

| DE | 1118134 B | * | 11/1961 |
| DE | 3047133 A | * | 6/1982 |
| DE | 3815927 A | * | 11/1989 |

* cited by examiner

Primary Examiner—Lynne H. Browne
Assistant Examiner—Ernesto Garcia
(74) Attorney, Agent, or Firm—Ronald E. Greigg

(57) ABSTRACT

In a device for connecting two parts for the sake of high-precision fixation of the two parts in a defined positioning to one another, two connection pairs are provided, each comprising one wedgelike tab, assigned to the first part and extending in the connection direction, and one wedge-shaped notch, assigned to the other part and extending in the connection direction, with a course of the wedge that is contrary to that to the tab, and into which notch the tab can be pressed, causing deformation. The two connection pairs are oriented such that the press-in directions of the tabs into the assigned notches are opposite one another in terms of the connection direction.

20 Claims, 2 Drawing Sheets

DEVICE FOR CONNECTING TWO PARTS

CROSS-REFERENCE TO RELATED APPLICATIONS

This application is a USC 371 application of PCT/DE 99/01527 filed on May 21, 1999.

PRIOR ART

The invention is based on a device for connecting two parts.

A known device for positionally secure connection of two structural parts, which have retaining edges, spaced apart from one another, on surfaces located in the same plane (German Patent Disclosure DE 30 47 133 A1), includes two connecting elements, which are inserted into the retaining edges of the structural parts and overlap one another. The connecting elements have detent and counterpart detent means, in the form of serrations and detent tongues, that rest on one another in the overlapping region and that enable a detent engagement at different mutual spacings of the two structural parts.

In an electric motor with a housing cylinder and at least one cover on the face end for closing an end opening of the housing cylinder (German Patent Disclosure DE 33 05 645 A1), it is known to secure the cover by means of a detent connection. For that purpose, the detent connection has two rows of teeth, extending axially to the housing cylinder and capable of detent engagement with one another, of which a first row of teeth is disposed on the cover, and a second row of teeth is disposed on the housing cylinder.

ADVANTAGES OF THE INVENTION

The connection device according to the invention has the advantage that the connection of the two parts can be made with a defined positioning of the axial position of the two parts to one another, and thus where the two parts are embodied as a housing and an end cover of an electric motor, the longitudinal armature play of the armature or rotor of the electric motor, the armature or rotor being received in a bearing toward the cover, can be fixedly set. The provision of two connection pairs with opposed inward pivoting directions of the tabs into the assigned notches enables sensitive adjustment and a reliably secure, final fixation of the two parts in a desired relation to one another.

BRIEF DESCRIPTION OF THE DRAWINGS

The invention is described in further detail in the ensuing description in terms of an exemplary embodiment shown in the drawing. Shown are.

DESCRIPTION OF THE EXEMPLARY EMBODIMENT

Figure 1:
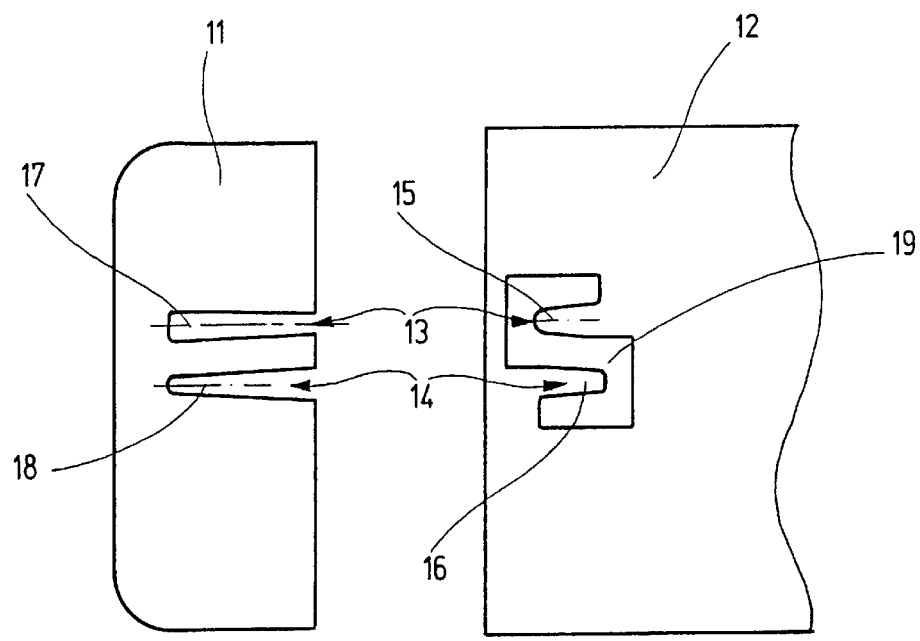
FIG. 1, a plan view of a housing and an end cover of an electric motor before they are connected to one another by means of a connection device.
Figure 2:
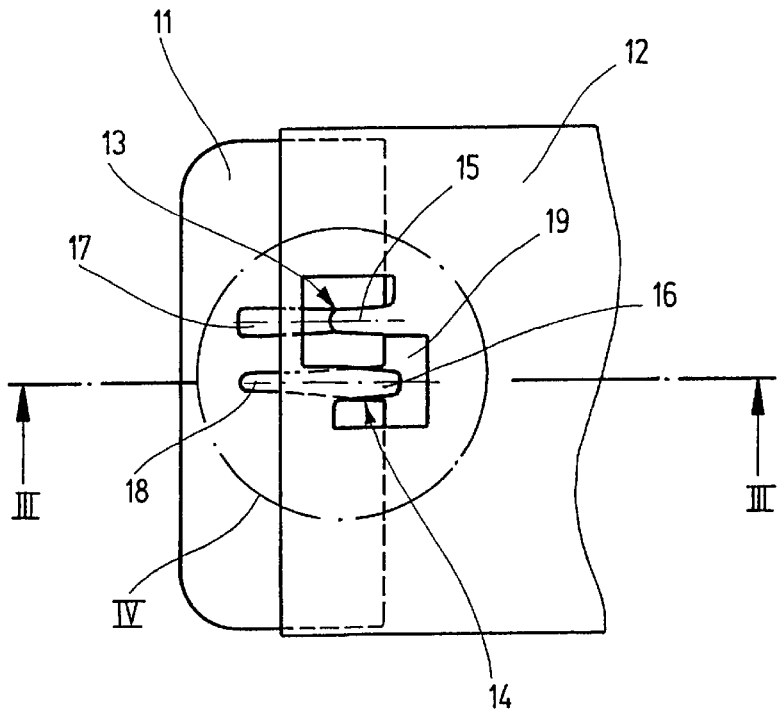
FIG. 2, a view identical to that of FIG. 1 after the housing and end cover have been connected.

With the device, shown in FIGS. 1–4, for connecting two parts, a caplike end cover 11 is secured to a cylindrical housing 12 of an electric motor; the housing 12 fits over the end cover 11 in the region of its cap edge, as seen from FIG. 2. Beyond this special exemplary embodiment, however, the connection device can also be used for connecting any two arbitrary parts.

The connection device, which in this special case of connecting the housing 12 and the end cover 11 at diametrically opposed points of the housing 12 and end cover 11, is present at least twice, includes two connection pairs 13, 14, each comprising one wedgelike tab 15 and 16, assigned to the first part and extending in the connection direction, and one wedge-shaped notch 17 and 18, assigned to the second part and extending in the connection direction and having a course of the wedge that is contrary to the tab 15. In this special exemplary embodiment, the two tabs 15, 16 of the connection pairs 13, 14 are assigned to the housing 12, and the two wedge-shaped notches 17, 18 are assigned to the end cover 11, specifically in such a way that in the overlapping region of the end cover 11 and housing 12 and the tabs 15, 16 are located above the notches 17, 18. The notches 17, 18 are embodied in the cap edge of the caplike end cover 11 parallel to one another with opposite courses of the wedges, so that on the circular-annular face end, oriented toward the housing 12, of the caplike end cover 11, the wedge-shaped notch 17 has its smallest wedge width, while the wedge-shaped notch 18 has its greatest wedge width. The two wedgelike tabs 15, 16 are relief-stamped in the housing jacket, spaced apart somewhat from the circular-annular face end of the housing 12 oriented toward the end cover 11, in such a way that the respective wedgelike tapers, originating at the roots of the tabs, on the two tabs 15, 16 extend oppositely. The two tabs 15, 16 are also disposed parallel to one another with an extension direction opposite the connection direction; the tabs 15, 16 each taper opposite one another from the root of the tab to the free end of the tab. The opening 19 that remains in the housing jacket after the two wedgelike tabs 15, 16 have been relief-stamped is used as a vent hole for the electric motor. As seen from FIG. 4, the tabs 15, 16 and the notches 17, 18 can be provided along their outer contours with a microscopic serration 20, to improve the mutual engagement of the tabs 15, 16 and notches 17, 18.

Figure 3:
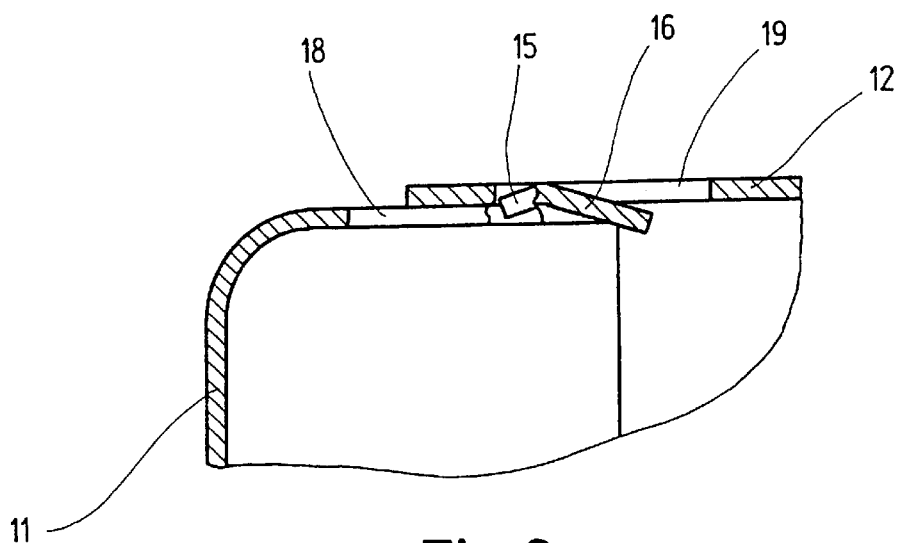
FIG. 3, a detail of a section taken along the line III—III of FIG. 2.
Figure 4:
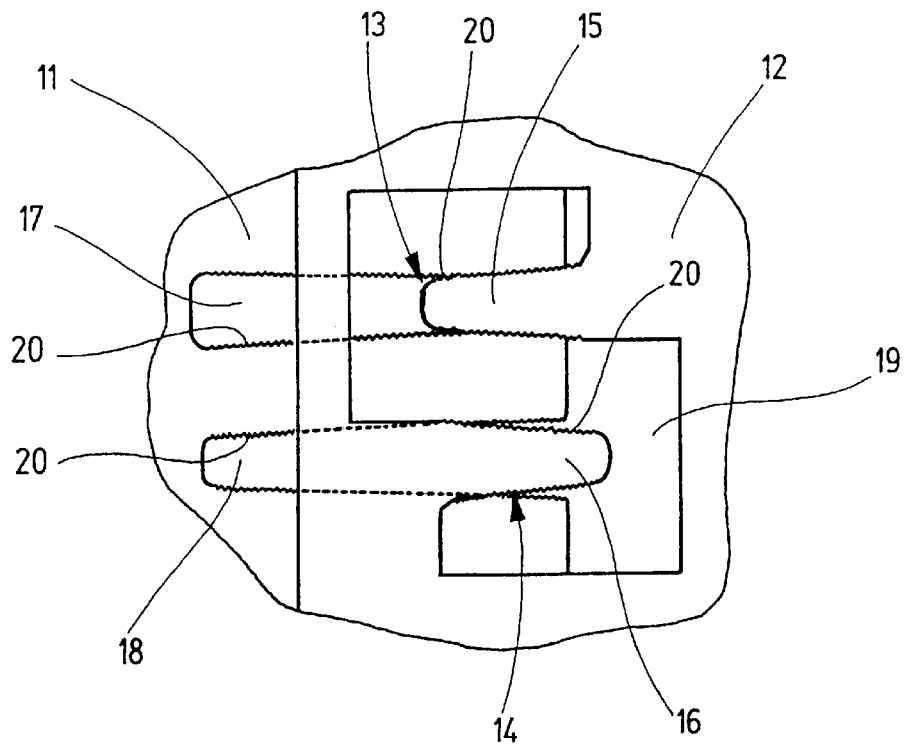
FIG. 4, an enlarged view of detail IV in FIG. 2.

Now, for establishing the connection, after the end cover 11 has been inserted into the face end of the housing 12, the two wedgelike tabs 15, 16 are pressed into the assigned notches 17, 18, causing deformation of the tabs 15, 16, as seen from FIG. 3. Since in the process the inward pivoting directions of the tabs 15, 16 into the assigned notches 17, 18 are opposite one another, seen in terms of the connection direction, at the end of the process of pressing the tabs 15, 16 in, the end cover 11 is reliably fixed to the housing 12 in an axially correct association. The wedge shape of the tabs 15, 16 and of the notches 17, 18 makes it possible to vary the relative location of the end cover 11 and housing 12 to one another, in terms of the axial direction, and thus to establish the axial play of an armature or rotor of the electric motor, the armature or rotor being received in the manner of a bearing in the end cover 11, in a highly sensitive and fixed way.

In addition, the free ends of the tabs 15, 16, which after the end cover 11 has been fixed in the housing 12 protrude through the wedge-shaped notches 17, 18, can be used to secure further components inside the housing 12 as well.

The invention is not limited to the described exemplary embodiment of a connection of an end cover 11 to a housing 12. On the contrary, arbitrary parts can be fixed in precise positions to one another with the connection device described. Nor is it necessary that the tabs and notches be made in the two parts themselves. On the contrary, these tabs and notches can be machined into separate connecting elements that are fixed in a suitable way to the two parts to be connected, for instance by being suspended in the two parts, as described in DE 30 47 133 A1, or by embodying such connecting elements integrally in the two parts.

The foregoing relates to preferred exemplary embodiments of the invention, it being understood that other variants and embodiments thereof are possible within the spirit and scope of the invention, the latter being defined by the appended claims.

What is claimed is:

1. A device comprising first and second parts (11, 12), which are otherwise movable towards and away from each other along a connection direction, and a connection means for connecting said first and second parts, said connection means having two connection pairs (13, 14), with each pair including one elongated wedge-shaped tab (15, 16) with both of the tabs being mounted on one of said parts and extending parallel to the connection direction and having a particular wedge angle, and each pair also including one wedge-shaped notch (17, 18), with both of the notches being assigned to the other of said parts, extending in the connection direction, and having a wedge angle, and each pair being aligned so that the tab aligns with the notch of the same pair, and each tab (15, 16) being deformable into the respective notch, the connection means being arranged such that the direction in which the elongated tabs extend is generally along the connection direction and opposite one another.

2. The device of claim 1 wherein a microscopic serration (20) is machined into the outer contours of each of the tabs (15, 16) and notches (17, 18).

3. The device of claim 1, wherein the tabs (15, 16) and the notches (17, 18) are respectively located in portions of the first and second parts which overlap when the parts are connected.

4. The device of claim 2, wherein the tabs (15, 16) and the notches (17, 18) are located in portions of the first and second parts which overlap when the parts are connected.

5. The device of claim 3, wherein the tabs (15, 16) are formed by relief-stamping.

6. The device of claim 4, wherein the tabs (15, 16) are formed by relief-stamping.

7. The device of claim 1, wherein one of the first and second parts is a cylindrical housing (12) for enclosing an electric motor and the other of the two parts is an end cover (11) for the cylindrical housing and wherein the tabs (15, 16) are mounted on the cylindrical housing (12), and the notches (17, 18) are assigned to the end cover and extend from an edge of the end cover (11).

8. The device of claim 2, wherein one of the first and second parts is a cylindrical housing (12) for enclosing an electric motor and the other of the two parts is an end cover (11) for the cylindrical housing and wherein the tabs (15, 16) are mounted on the cylindrical housing (12), and the notches (17, 18) are assigned to the end cover and extend from an edge of the end cover (11).

9. The device of claim 7, wherein the tabs (15, 16) are relief-stamped on the cylindrical housing in such a way that the resultant opening (19) forms a hole for ventilating a motor enclosed in the housing.

10. The device of claim 8, wherein the tabs (15, 16) are relief-stamped on the cylindrical housing in such a way that the resultant opening (19) forms a hole for ventilating a motor enclosed in the housing.

11. A device comprising first and second parts (11, 12), which are otherwise moveable towards and away from each other along a connection direction, and connection means for connecting said first part to said second part (11, 12), said connection means having two connection pairs (13, 14), each pair comprising one elongated wedge-shaped tab (15, 16) and one wedge-shaped notch, wherein the wedge-shaped tabs from each pair are mounted on the first part and extend generally parallel to the connection direction, with each tab having a wedge angle, and the wedge-shaped notches from each pair are mounted on the second part and extend generally parallel to the connection direction, with each notch having a wedge angle, so that when the first and second parts are brought together along the connection direction, each tab (15, 16) is deformable, and thus deformable into the respective notch, the directions of the tabs (15, 16) are generally opposite each other.

12. The device of claim 11, wherein a microscopic serration (20) is machined into the outer contours of each of the tabs (15, 16) and notches (17, 18).

13. The device of claim 11, wherein the tabs (15, 16) and the notches (17, 18) are respectively located in portions of the first and second parts which overlap when the parts are connected.

14. The device of claim 12, wherein the tabs (15, 16) and the notches (17, 18) are located in portions of the first and second parts which overlap when the parts are connected.

15. The device of claim 13, wherein the tabs (15, 16) are formed by relief-stamping.

16. The device of claim 14, wherein the tabs (15, 16) are formed by relief-stamping.

17. The device of claim 11, wherein one of the first and second parts is a cylindrical housing (12) for enclosing an electric motor and the other of the two parts is an end cover (11) for the cylindrical housing and wherein the tabs (15, 16) are mounted on the cylindrical housing (12), and the notches (17, 18) are assigned to the end cover and extend from an edge of the end cover (11).

18. The device of claim 12, wherein one of the first and second parts is a cylindrical housing (12) for enclosing an electric motor and the other of the two parts is an end cover (11) for the cylindrical housing and wherein the tabs (15, 16) are mounted on the cylindrical housing (12), and the notches (17, 18) are assigned to the end cover and extend from an edge of the end cover (11).

19. The device of claim 17, wherein the tabs (15, 16) are relief-stamped on the cylindrical housing in such a way that the resultant opening (19) forms a hole for ventilating a motor enclosed in the housing.

20. The device of claim 18, wherein the tabs (15, 16) are relief-stamped on the cylindrical housing in such a way that the resultant opening (19) forms a hole for ventilating a motor enclosed in the housing.

* * * * *